United States Patent [19]

Stell

[11] Patent Number: 4,498,098

[45] Date of Patent: Feb. 5, 1985

[54] APPARATUS FOR COMBINING A VIDEO SIGNAL WITH GRAPHICS AND TEXT FROM A COMPUTER

[75] Inventor: Douglas E. Stell, Acton, Mass.

[73] Assignee: Digital Equipment Corporation, Maynard, Mass.

[21] Appl. No.: 384,439

[22] Filed: Jun. 2, 1982

[51] Int. Cl.[3] .......... H04N 9/535

[52] U.S. Cl. .......... 358/22; 358/310

[58] Field of Search .......... 358/310, 17, 22, 148, 358/149, 183, 22; 364/521; 340/721, 726, 703, 814

[56] References Cited

U.S. PATENT DOCUMENTS

| | | | |
|---|---|---|---|
| Re. 30,785 | 10/1981 | Lovercheck et al. . | |
| 3,900,887 | 8/1975 | Soga et al. . | |
| 3,993,864 | 11/1976 | Pye et al. . | |
| 4,028,733 | 6/1977 | Ulicki . | |
| 4,064,540 | 12/1977 | Jetten . | |
| 4,074,315 | 2/1978 | Kawamura et al. . | |
| 4,122,477 | 10/1978 | Gallo . | |
| 4,135,182 | 1/1979 | Bell et al. . | |
| 4,145,719 | 3/1979 | Hand et al. . | |
| 4,178,613 | 12/1979 | Takahashi et al. . | |
| 4,179,703 | 12/1979 | Abbott . | |
| 4,213,124 | 7/1980 | Barda et al. . | |
| 4,215,369 | 7/1980 | Iijima . | |
| 4,218,698 | 8/1980 | Bart et al. . | |
| 4,233,628 | 11/1980 | Ciciora . | |
| 4,237,484 | 12/1980 | Brown et al. . | |
| 4,240,101 | 12/1980 | Michael et al. . | |
| 4,245,252 | 1/1981 | Nagumo . | |
| 4,264,924 | 4/1981 | Freeman . | |
| 4,264,925 | 4/1981 | Freeman et al. . | |
| 4,278,973 | 7/1981 | Hughes et al. . | |
| 4,278,993 | 7/1981 | Suzuki | 358/22 |
| 4,283,736 | 8/1981 | Morio et al. . | |
| 4,283,738 | 8/1981 | Rutishauser . | |
| 4,287,528 | 9/1981 | Levy . | |
| 4,290,062 | 9/1981 | Marti et al. . | |
| 4,425,581 | 1/1984 | Schweppe et al. | 358/183 |

OTHER PUBLICATIONS

Byte Magazine, vol. 7, No. 6 (Jun. 1982).

*Primary Examiner*—Richard Murray
*Attorney, Agent, or Firm*—Cesari and McKenna

[57] ABSTRACT

Apparatus for combining video signals from a video source, such as a video disc player, with computer-generated graphics/text output on a single display, for overlaying the two. The computer-generated video is provided in RGB format; the other video is converted to RGB format if not already in that form and the two sets of RGB signals are provided to a switch. The switch (i.e., multiplexer) selects which one of the two RGB signal sets to display; this selection is made separately for each pixel. In one embodiment, the color of the computer-generated signals controls the switch's selection of source. A master-slave synchronization system maintains registration between the two sets of RGB signals. When the video source is unstable (as, for example, with a video disc player), a master sync generator provides a house (coarse) synchronization signal to the video disc player. (For stable sources, this is unnecessary) The slave synchronization generator locks the video switch, display and computer video generator to the timing of the video image source (such as video disc player). Thus, the rest of the system tracks the jitter of the video source. When the video disc player is scanning or is being spun up or down, the slave sync generator locks onto the house sync signal of the master sync generator, instead of the video disk player's output, to avoid rolling and tearing of the display.

9 Claims, 11 Drawing Figures

APPARATUS FOR COMBINING A VIDEO SIGNAL WITH GRAPHICS AND TEXT FROM A COMPUTER

CROSS-REFERENCE TO RELATED APPLICATIONS

This application is related to the commonly-assigned application of Jesse M. Heines, Linda (a/k/a Lin) J. Olsen, and Roger S. Bowker, titled Interactive Computer-Based Information Display System, filed on even date herewith, Ser. No. 384,409.

FIELD OF THE INVENTION

This invention relates to the field of information display and, more particularly, to high resolution raster scan video displays. It involves apparatus for combining (i.e., overlaying) output from a video source (such as a video disc player) with text and graphics data from a computer, for display on a common screen. The invention sees particular utility in electronic retrieval of images and the visual annotation of images, such as in interactive computer-based instruction systems and record-keeping systems.

BACKGROUND OF THE INVENTION

Much work has been done, particularly in recent years, regarding apparatus for combining informatin from multiple sources for display on a common output device, such as a television. These efforts have, for example, included apparatus for adding textual, data or graphics display to a televised video signal.

Exciting possibilities have been suggested with the advent of a new recording medium, the video disc, and a source of video signals, the video disc player. The video disc is a rotating medium which typically can store up to 54,000 frames of addressable video images in standard television (e.g., NTSC) format, with accompanying audio. These can be displayed as up to 30 minutes (or more) of moving sequences, or as individual still frames, with no restriction on the time duration of the still frame mode. The video disc player, the machine which reads information stored on a video disc, is a random access device in which each frame may be called up for display within an average seek time of about 3 seconds. Due to this ability to switch rapidly from one video frame to another on the disc, video discs are a good medium for storing records, such as inventory files which must be consulted frequently, and for storing the video portion of so-called courseware for computer-based instruction (i.e., the material to be presented to the student). Rapid switching of frames and frame sequences is important in order for the instructional sequence to be responsive to input from the student. That is, if a student gives a correct response to a question, the course must advance to a first preselected frame; but if he or she gives an incorrect response, it must advance to a second, different, preselected frame. Indeed, with this capability, it may also be possible to use the same recorded video information for different courses by presenting it in different sequences.

Clearly, the scenario just discussed is one which assumes the interaction of a video disc player with a computer which evaluates student responses and causes the video disc player to choose its display sequence in accordance therewith. A commercial video disc player such as used herein includes a computer interface through which it can be controlled by the courseware program running in an external processor, and external synchronization inputs through which it can be somewhat, but not completely, synchronized to the remainder of the video system. The above-referenced commonly-assigned application titled Interactive Computer-Based Information Display System relates to such a use of the apparatus described herein.

One of the most significant problems in mating a video disc player with a computer for providing computer-based instruction or image retrieval with graphics/text overlay as outlined herein is that of synchronizing the video output from the computer with the output from the video disc player, since very precise placement of both images is needed. With a high resolution display which normally is viewed at close distances, such as a video display terminal which would be used for educational purposes, the synchronization error and jitter must be significantly less than the size of one pixel (picture element) or phosphor dot on the display; otherwise, the graphics or textual display will not line up vertically from one line to the next; as a result, the user will find the display jittery, uncomfortable and fatiguing to watch and unsatisfactory for use. The situation is particularly egregious when the video source is a video disc player (VDP), since the VDP is a rotational mechanical device lacking precise time base correction. It therefore exhibits a large amount of horizontal jitter. This jitter usually takes the form of large jumps in the temporal position of the output composite video signal, including the horizontal sync pulse thereof, relative to the "house" sync input to the player or the player's internal sync source. The magnitude of this jitter frequently is as wide as one or two complete characters on the display, which obviously is unacceptable. Expensive laboratory-type equipment exists for supplying a time-base correction to the video disc player's output in order to provide a stable display. This equipment, though, is so expensive as to be absolutely useless in a commercial product of the type envisioned herein.

Combining the video disc output with computer-generated text or graphics output leads to other substantial problems, also. In the prior art, the approach generally has been to convert the computer video signals to NTSC (or other compatible) composite video signals and then to produce the combined display by switching between that signal and the NTSC signal from the video disc player, such as switching with convential "chroma key" switching. Because the phase of an NTSC composite video signal contains the encoded color information, and phase cannot be matched perfectly when switching, this approach sacrifices color purity. And encoding any video signal, especially a high resolution signal, in the NTSC format sacrifices resolution and introduces dot crawl, rainbows and smearing due to bandwidth restrictions. Moreover, because of the manner in which the NTSC signal is recorded on the video disc and the techniques used to do still frame display, the color subcarrier phase is shifted on a frame-to-frame basis. If the graphics/text source is to be encoded into and merged as an NTSC signal, severe color shifts may result. The only cure known to date is to use an indirect color-time base corrector or frame buffer which decodes, stores and reencodes the NTSC signal. Its cost, unfortunately, is quite large. For this reason, NTSC overlay of a video disc signal is technically impractical outside the laboratory or sophiscated television studio.

SUMMARY OF THE INVENTION

This invention eliminates the need for such expensive time-base correctors and thereby overcomes these prior art problems. In doing so, it provides a system for overlaying video from almost any source with graphics and text from a computer, for high resolution display. The solution is two-fold. First, very accurate synchronization procedures are employed to make all timing take place relative to the video source's synchronization signals (e.g., a VDP's NTSC synchronization signals), thereby permitting the display to act as the system time base corrector. Second, the video source signal is converted to its component red, green and blue (i.e., RGB) signals (if not already in that format) before mixing them with the graphic/text computer output in three wide-band switching circuits, thereby avoiding the problems associated with switching an encoded composite video signal, such as NTSC. The result is a system which displays up to four times the text in a given area of a screen with perhaps an order magnitude better quality than would be possible by switching NTSC signals, without the use of costly time-based correctors or frame buffers. Non-NTSC signals can be handled equally well.

The synchronization circuit consists of a master sync generator and a slave sync generator. The master sync generator generates a house sync signal and color subcarrier which are fed to the video source (e.g., video disc player). The slave sync generator can be synchronized either to the NTSC signal coming from the video source or to the master sync generator, under software control, to generate sync for the display device as well as various timing signals.

The video sync generator of the computer is also locked to the slave sync generator. That is, when the video disc player is on line, it is the main source of timing, in order to accommodate the large amount of jitter in its output; the rest of the system is designed to jitter with the output of the video disc player. The horizontal sweep circuit of the display device is designed to operate effectively as the system time-base corrector, to compensate rapidly for jitter and provide a stable picture. The slave sync generator provides composite sync and blanking for the display device, and timing signals for the NTSC-to-RGB converter which tracks the video disc player's output.

When the video disc player (VDP) scans, searches or spins up or down (i.e., is started or stopped), its output may disappear completely or may contain a large number of false sync pulses. Therefore, the output of the VDP is disconnected from the synchronization circuitry during these operations. It is then necessary for the system to reestablish the synchronization to the player when it comes back on line, without tearing or rolling the image on the screen. For these reasons, the master sync signal is provided to the player and the slave sync generator is switched between tracking the master sync generator, with some fixed delay compensation, and tracking the NTSC signal from the VDP. The VDP is within its normal jitter window when it comes back on line, so the resulting effect of switching the synchronization source is not noticeable to the viewer.

The 3.579545 MHz subcarrier is supplied to the VDP whenever house sync is supplied.

The vertical and horizontal synchronization functions of the slave sync generator are separate from each other.

The horizontal synchronization of the slave sync generator is accomplished by means of a phase locking loop (PLL). The phase detector of the PLL is sensitive only to the leading edge of the horizontal sync pulses of the composite sync signals presented to its two inputs. It will ignore the equalizing pulses and serrations located at the center of those lines in and near the vertical interval.

While one input to the phase detector is always the output of the slave sync generator or the feedback path, the other is switchable. If the video disc player is on line and presenting a valid sync signal it is the reference input. Otherwise, a delayed version of the house composite sync signal is used. This signal, termed "FAKE SYNC", is delayed by the average delay of the video disc player plus the sync detector, to minimize the average correction necessary as the system switches between the two references. Switching takes place only at the $\frac{1}{4}$ and $\frac{3}{4}$ line positions, insuring that transient signals are ignored by the phase detector.

Vertical synchronization is accomplished by detecting the vertical sync interval in the reference waveform. If this detection occurs during the proper half of a line, the proper field has been identified and the vertical counter is reset to the proper condition ($11\frac{1}{2}$ lines past field index).

The reference signal for the vertical reference detector comes from the house sync generator whether or not the VDP is on line. While the disc is usually operating on the same line as the house sync generator, its output signal can either disappear or contain false vertical intervals; therefore, the more reliable signal is used. However, the system can not synchronize fully to a random, independant signal.

To permit complete synchronization, unrelated to the house sync generator, a GENLOK mode is provided. In this mode, all references are taken from the input video signal. This will permit operation in a TV studio where a clean sync signal is guaranteed from the studio house sync generator. It will also permit operation with lower cost video disc players in the future when and if they can provide a clean output, especially while scanning or searching.

The wide-band switching circuits which combine the two video signals are controlled by some attribute of the computer's video output signal, such as its color. For example, one color is preselected as "transparent". When this color appears at the computer's output, the switch feeds the VDP output to the display, as though the computer were not present. Otherwise, the computer's output is displayed. The switching decision is made separately for each pixel. The display can therefore comprise the VDP alone, the computer alone or an overlay combining the two. Through the use of an optional color map, one can display the transparent color also, by mapping some other color generated by the computer to the transparent color at the display. For example, if black is the transparent color used to operate the switch, a color map on the output of the computer can transform one or the other signals to black for display; when the programmer wants a black pixel, he or she causes the computer to generate black instead.

In addition, the display quality of a high resolution monitor is not compromised as it would be were the signals to be combined in the NTSC format.

Thus, a computer now can be used both to control the sequence of access to the frames stored on a video disc, responsive to a program interactive with a user's input, as well as providing the text and graphics to be overlaid thereon at the display. And even if the video source is a live video signal, not one from storage, the overlay capability can be used by itself.

BRIEF DESCRIPTION OF THE DRAWINGS

For a fuller understanding of the nature and objects of the invention, reference should be had to the following detailed description, taken in connection with the accompanying drawings, in which.

DESCRIPTION OF AN ILLUSTRATIVE EMBODIMENT

Figure 1:
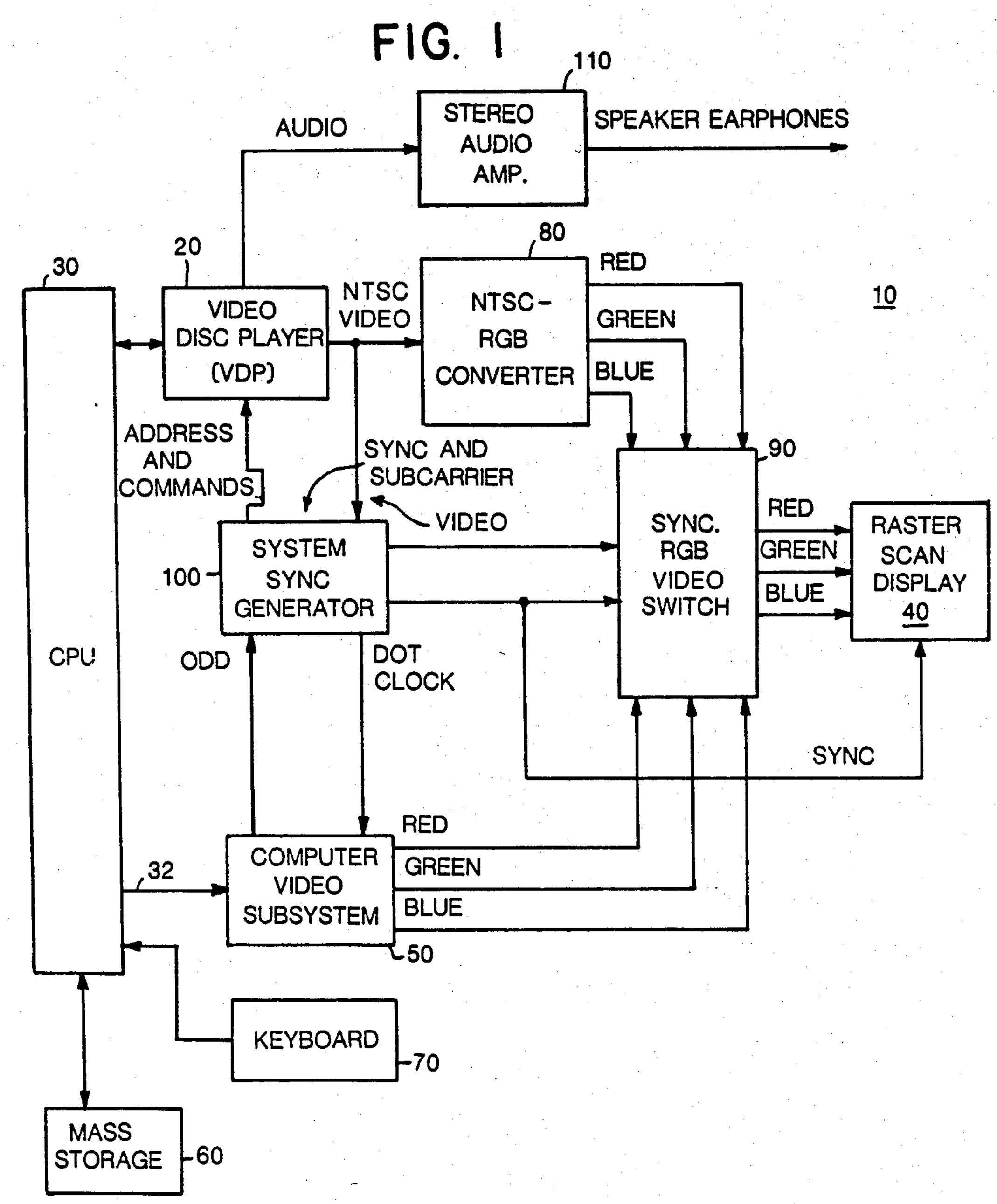
FIG. 1 is a block diagram of apparatus according to the present invention, for combining the output from a video disc player with text and graphics from a computer.

With the reference now to FIG. 1, there is shown a block diagram of apparatus 10 according to the present invention, for combining the output from a video disc player (VDP) 20 and a computer CPU 30 for joint (i.e., overlaid) display on a raster scan display device 40. The display 40 is understood to be a high-resolution monitor type CRT. The remaining components of this system, at this block diagram level, are a video subsystem 50 for converting the character and graphics signals from the CPU 30 into signals for driving the display 40, mass storage 60, a keyboard 70, an NTSC-to-RGB converter 80 for converting the NTSC-encoded output of VDP 20 into RGB format, a synchronized RGB video switch 90 for feeding appropriate RGB signals to the display 40, a system sync generator 100 and the stereo audio amplifier 110.

The video switch 90 selects, pixel by pixel, the source to be shown on display 40; the source is, of course, either VDP 20 (via NTSC-to-RGB converter 80) or computer video sub-system 50.

System sync generator 100 maintains synchronization between video disc player 20, computer video sub-system 50, video switch 90 and display 40. It is the nerve center of the system.

As explained above, when the video disc player is on line and operating, it must be the main source of timing. The rest of the system is designed to jitter with the player's output.

System sync generator 100 provides a master sync signal to the video disc player 20, commanding the VDP to an approximate synchronization relationship. It also monitors the output of the video disc player 20 and on the basis of the actual timing of the sync signal detected therein, provides a slave sync signal to video switch 90 and display 40, along with a dot clock control signal to the computer video sub-system 50.

Figure 2:
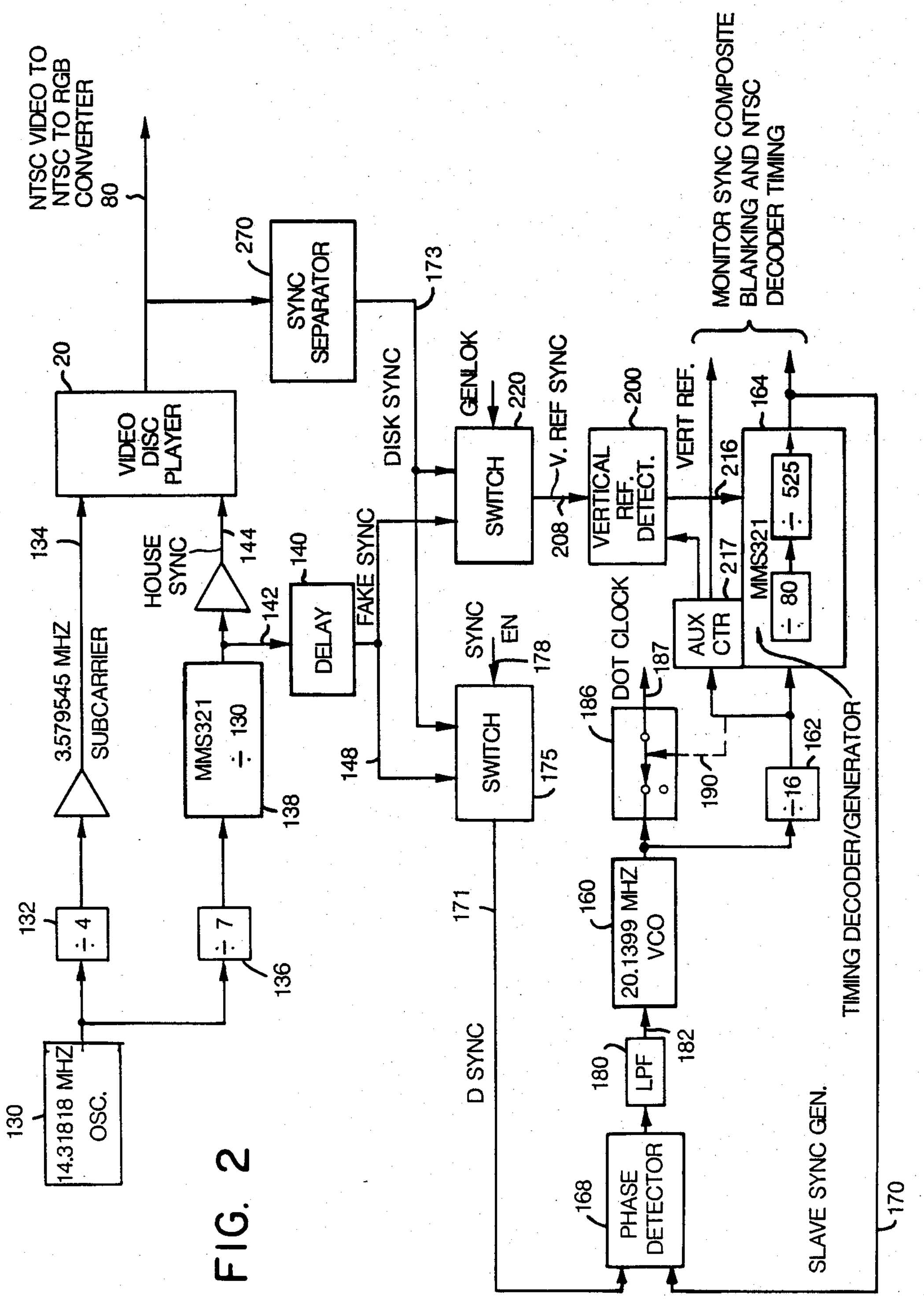
FIG. 2 is a block diagram of apparatus for generating master synchronization signals and slave sync signals.

FIG. 2 shows a simplified block diagram of apparatus for generating the master synchronization signals to the video disc player and the slave sync signals to the display and to the computer video subsystem.

Horizontal timing is derived from an oscillator 130 operating at 14.31818 MHz. Oscillator 130 drives a divide-by-four circuit 132 to provide a 3.579545 MHz subcarrier to the video disc player 20, on line 134.

Oscillator 130 also generates the house sync signal via a divide-by-7 circuit 136 and a divide-by-130 circuit 138. The divide-by-130 circuit 138 supplies a house composite sync signal, at the horizontal line frequency, on line 144, to the video disc player 20. Commercially available integrated circuits exist which are well-suited to the task of generating the numerous timing (i.e., sync and blanking) signals required in color television systems. One such device, suitable for use as divider 138 is National Semiconductor Corporation MM5320 or MM5321 TV camera sync generator chip, which is the device illustrated in the drawing herein. The above-described FAKE SYNC signal (used by the slave sync generator when the video disc player is off-line) also is derived from the house sync signal via a delay 140.

The slave sync generator operates from a voltage controlled oscillator (VCO) 160 which drives a phase locking loop. VCO 160 nominally operates at a frequency of 20.1399 MHz, which is supplied to a divide-by-16 circuit 162 to provide a 1.2587 MHz input to a timing decoder 164 (another MM 5321), which divides that input by a factor of 80 to obtain a signal at the horizontal line frequency, on line 170. A phase detector 168 compares the instantaneous phase of the asserting edge of the composite sync signal on line 170 with an external input on line 171. Only the edge of the sync signal falling within a window in the vicinity of horizontal sync is considered for detection. The external sync input on line 171 (termed D SYNC) is selected by a switch 175 to be either the master sync generator (i.e., the FAKE SYNC signal on line 148) or the DISC SYNC signal on line 173; the latter signal is the sync contained in the video output of the video disc player. Switch 175 is controlled by the state of a SYNC EN signal on line 178; this signal selects the DISC SYNC signal when the video disc player is on line and the FAKE SYNC signal when the video disc player is off line. The output of phase detector 168 drives a low pass loop filter 180 which, in turn, supplies a control signal (VCO CTL) on line 182 to VCO 160, to adjust the phase of the VCO output so as to drive the phase error output of phase detector 168. The phase locking loop is thus designed to operate with an almost zero phase error between its two inputs and to adapt rapidly to steps in phase error which may be produced by the jitter of the VDP.

The output of VCO 160 also is supplied, through a controlled switch 186, to the computer's video subsystem as its dot clock (i.e., the clock controlling its output). The switch can turn off the dot clock when the commputer video source must be stopped to allow the VDP to catch up.

Vertical synchronization of the slave sync generator also is illustrated in FIG. 2. It is quite different from horizontal synchronization. The position of the vertical sync is sensed in the input composite sync signal; it is then used to digitally reset the vertical sync counter (which provides the slave sync signal) to the same vertical position.

As alluded to above, there are three modes of sync operation, providing two different vertical slave sync derivations. First, the slave sync generator can track the video disc player completely, deriving both horizontal and vertical sync references from the video disc player's output, to permit full synchronization to an external input. Second, since the output signal from the VDP may contain false sync pulses (as it will be during search and scan operations, for example), the vertical sync reference for the display can be generated from the master sync, so that the image will not roll. Horizontal sync is taken from the video disc signal. Third, the slave sync generator can track the master directly and provide both horizontal and vertical sync therefrom, with the video disc player off line.

A vertical reference detector 200 supplies a signal labeled VERT REF on line 216, which indicates the end of the vertical sync interval in a reference waveform VREF SYNC on line 208. The VERT REF signal is used to reset the vertical counter in timing decoder 164. Timing for the vertical reference detector 200 is supplied by an auxiliary counter 217. The VERT REF sync signal on line 208 is supplied by a switch 220 which selects either the DISC SYNC signal on line 173 or the FAKE SYNC signal on line 148.

Figure 3:
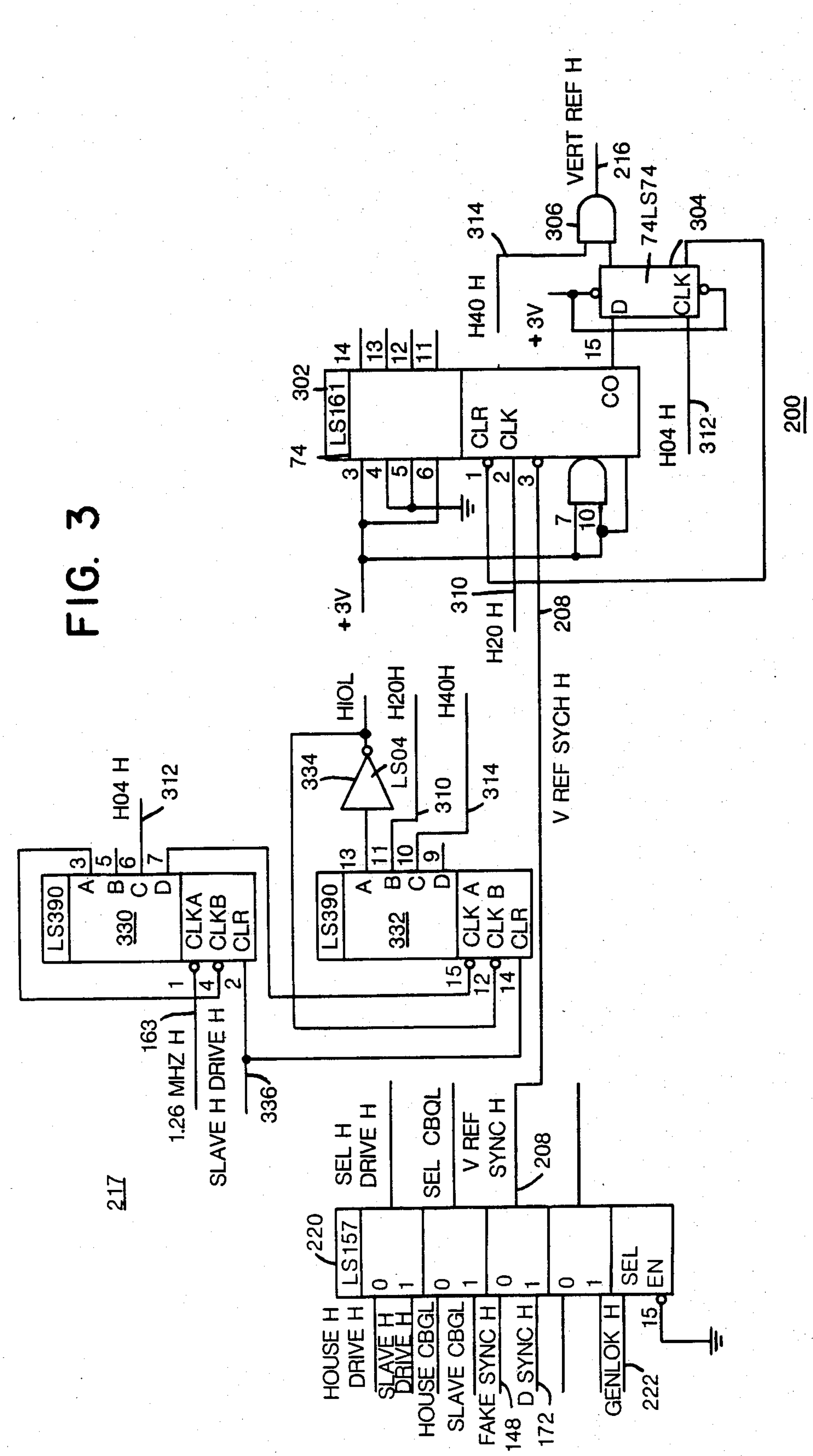
FIG. 3 shows detailed logic for the vertical reference detector 200 of FIG. 2.

FIG. 3 shows detailed logic for the vertical reference detector 200. The key elements are register 302, flip-flop 304 and GATE 306. The vertical reference detector 200 insures that the video disc player and the computer source are working on the same vertical line. It receives as inputs the VREF SYNC signal in line 208, plus appropriate timing signals on lines 310, 312 and 314, which signals occur at various locations during a horizontal line and are supplied by auxiliary counter 217. The VERT REF signal on line 216, of course, is the output of the vertical interval detector. (Note that the "H" or "L" suffix following a signal name on the drawing merely represents the asserted state of the signal.)

The VREF SYNC signal on line 208 is generated by a multiplexer (i.e., switch) 220. Multiplexer 220 has two possible inputs; the desired input is selected by a GENLOK signal on line 222, and becomes the VREF SYNC signal. The two possible input signals are labelled FAKE SYNC and DISC SYNC. The FAKE SYNC signal is simply a delayed version of the house (i.e., master) sync signal. Thus, depending upon the state of the GENLOK signal, the VREF SYNC signal is either FAKE SYNC or DISC SYNC; these correspond to generating the slave vertical sync from the master SYNC and the VDP, respectively.

Thus, when not in GENLOK mode, the vertical position (VERT REF) is always derived from the master sync generator via the FAKE SYNC signal on line 148 in order to provide maximum protection against false sync detection. In GENLOK mode, by contrast, and the vertical position is then derived from the NTSC input from the VDP via the DISC SYNC signal on line 173.

When the sync generator of the computer video system is operating in the standard 525 line per frame interlaced mode, it has both the same line division ratio and the same number of lines as does the slave sync generator. Therefore, it will remain in synchronization with the slave sync generator once synchronization is established. Initial synchronization is accomplished by detecting a specific point in the state of the computer video sub-system sync generator and the slave sync generator. This is done once per frame at the end of the visible area in the odd field. If the two points do not coincide, the dot clock to the computer video sub-system is stopped, causing it to wait in a known state for the slave generator to reach the same state. If the two points coincide, the clock is not stopped, since the system is in sync.

Figure 4:
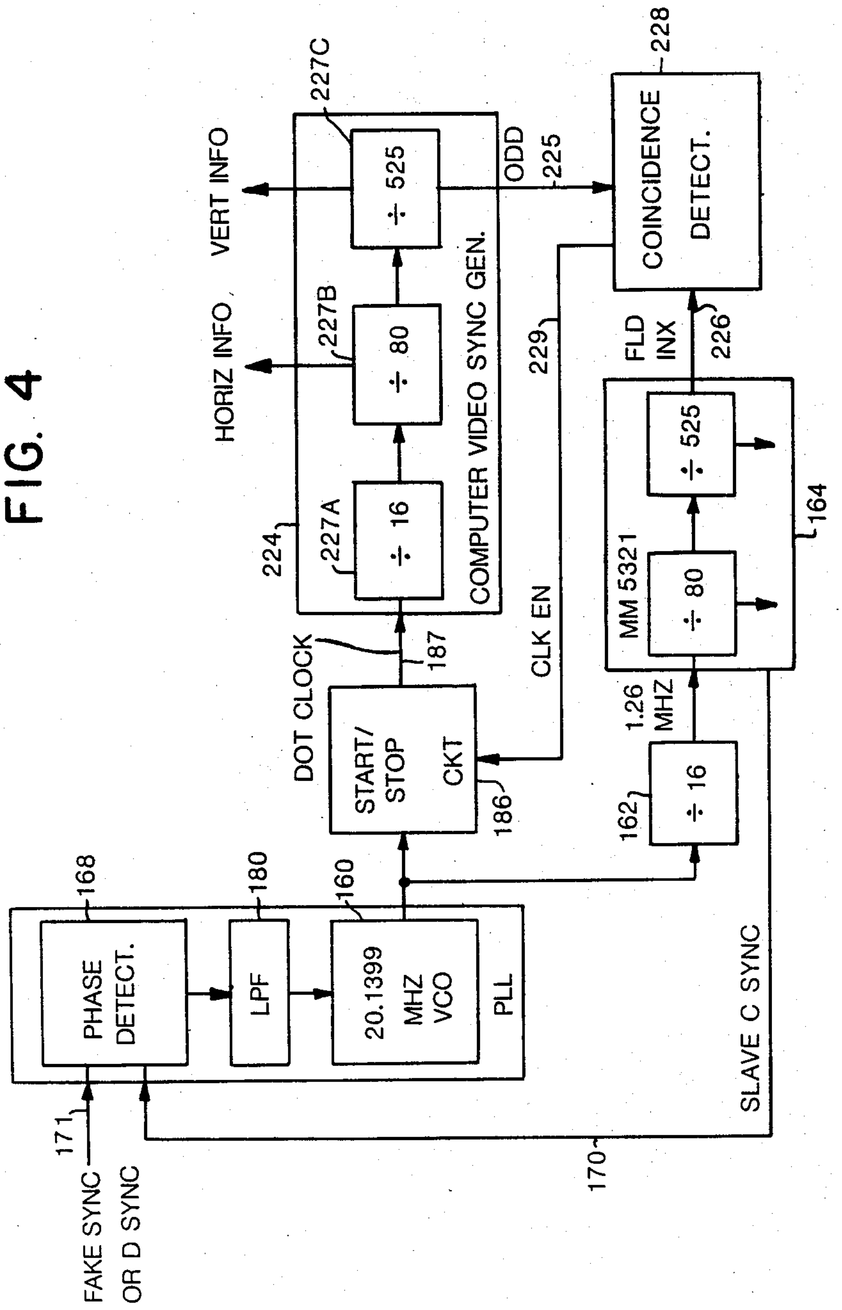
FIG. 4 is a block diagram of apparatus for synchronizing the computer video sync generator with the slave sync generator of FIG. 2.

FIG. 4 illustrates the scheme for synchronizing the computer video sync generator with the slave sync generator. In the computer video subsystem, an internal sync generator, the Computer Video Sync Generator (or CVSG) 224, provides all timing signals for the computer display functions. The MM5321 sync generator chip 164 of the slave sync generator circuit provides all timing for the NTSC decoding and blanking functions. The MM5321 chip 164 and the CVSG 224 must be locked together for the system to function properly. To this end, both provide a signal which completely specifies the device's exact vertical and horizontal position. With respect to the CVSG, this is referred to as the ODD signal supplied on line 225 of the drawing; with respect to the MM5321, it is the field index (FLD INX) signal on line 226. One edge of each of those signals occurs at exactly the same postion of the display. Therefore, the devices may be synchronized by making those two edges coincident.

The ODD signal is a "1" for the 262½ lines of the odd video field and "0" for the even video field. It is, therefore, a 30 Hz square wave with transitions at the bottom of the visible area of each field. The FLD INX signal is a pulse of about two microseconds in width at a 30 Hz rate, also occuring at the bottom of the visible area of the ODD FIELD.

As seen in FIG. 4, the CVSG may, (at least for purposes of illustration) consist of a divide-by-16 circuit 227A and a divide-by-80 227B for horizontal synchronization, followed by a divide-by-525 circuit 227C for vertical field detection. Divider 227C provides the ODD signal on line 225. The state of the ODD signal changes every 262½ lines.

The ODD and FLD INX signals should remain in sync once synchronized, since they run from the same 20.1399 MHz clock and have the same division ratio.

A coincidence detector 228 generates a clock enable (CLK EN signal on line 229 to start-stop circuit 186.) The CLK EN signal is used to gate off the start-stop circuit and thus turn off the DOT CLOCK signal to the CVSG 224 when the ODD and FLD INX signals are not in synchronization.

Figure 5:
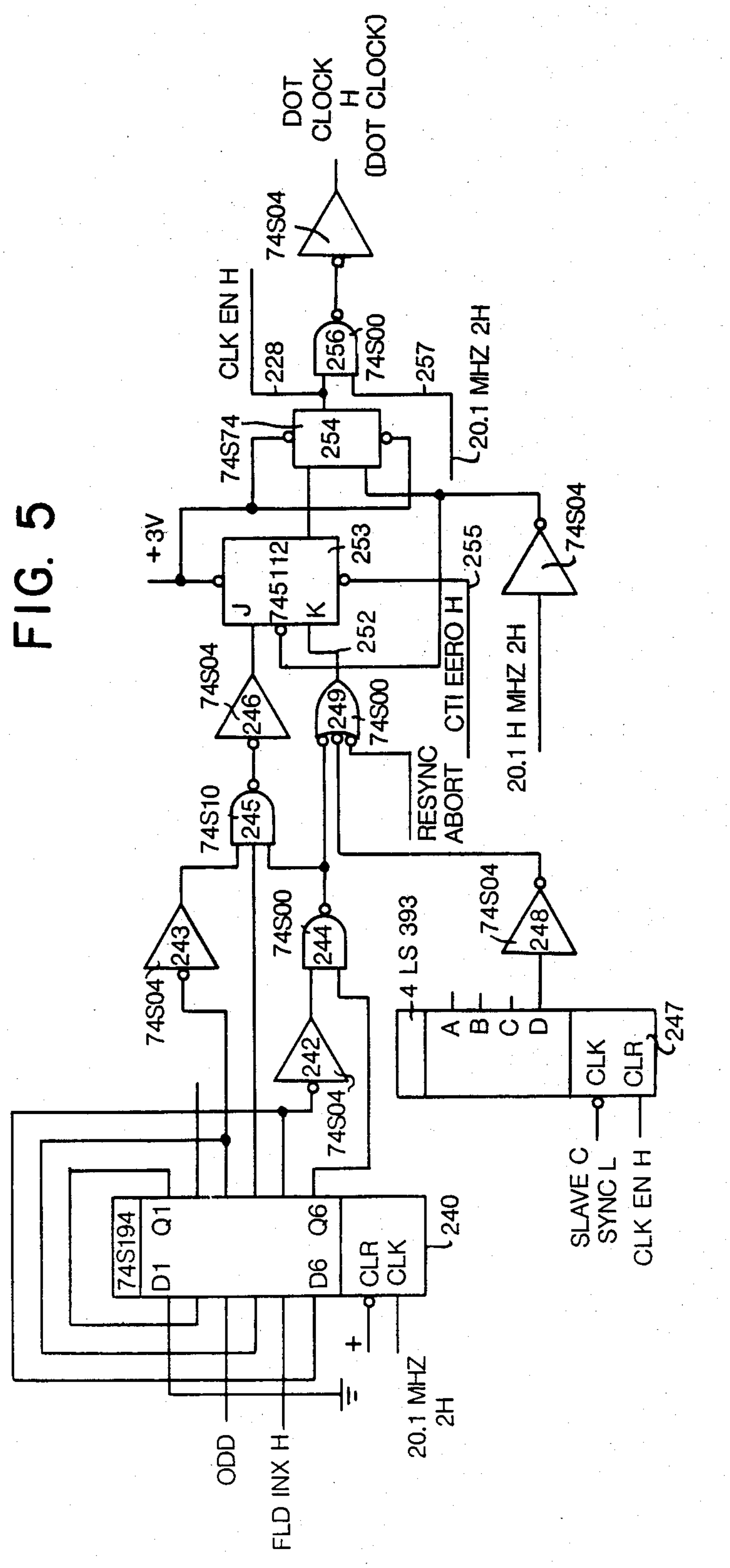
FIG. 5 is a detailed logic diagram of the coincidence detector 228 and start-stop circuit 186 of FIG. 4.

A detailed logic diagram of the coincidence detector 228 and start-stop circuit 186 is shown in FIG. 5. There, a shift register 240 and logic-gated delay network 242–249 "differentiate" both the ODD and FLD INX signals to produce 49 nsec pulses on line 251 and 252, respectively, at the 1-to-0 transition of each of those signals. If the two 49 nsec pulses are coincident, the system is in synchronization and no action is taken. That is, the pulse derived from the FLD INX signal at the output of gate 244 and applied to the "K" input of the J-K flip-flop 253 via gate 249 also turns off gate 245 and with it, the pulse derived from the ODD signal, which is normally applied to the "J" input of flip-flop 253.

Figure 6:
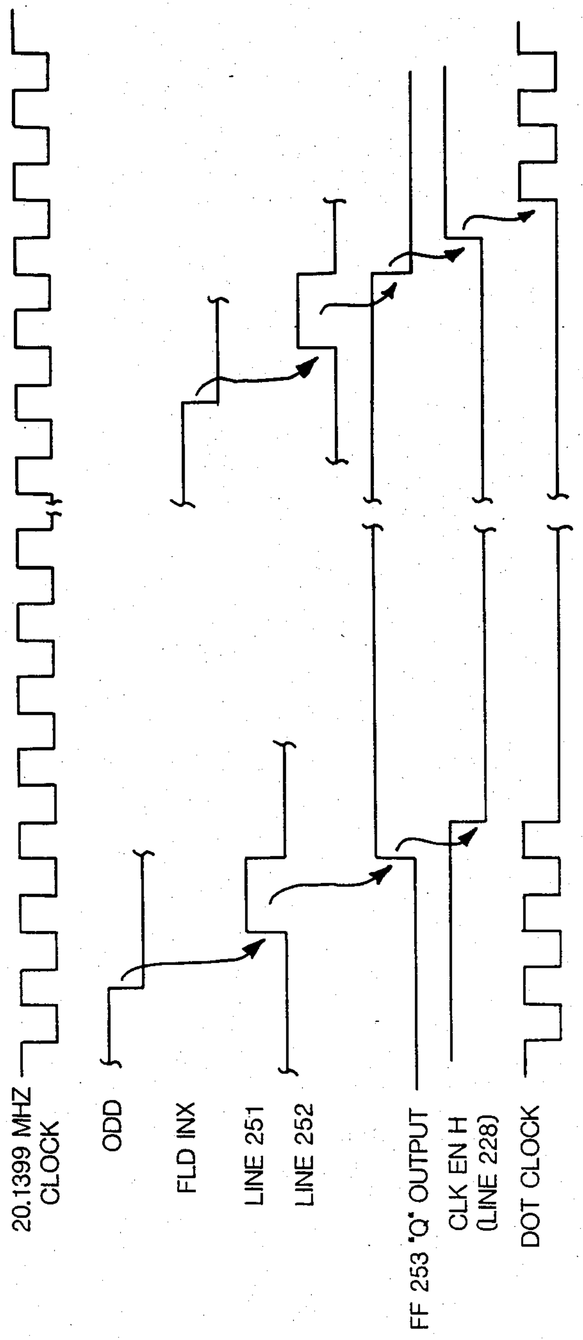
FIG. 6 is an illustration of timing diagrams explaining the operation of the apparatus of FIG. 5.

The system is out of synchronization if the two 49 nsec pulses are not coincident. The pulse derived from the ODD signal, at the output of gate 245, is applied to the "J" of the flip-flop 253. This causes flip-flop 253 to set, which turns off the clock enable signal (CLK EN) to the CVSG, at the output of D-type flip-flop 254, on line 228. When the pulse derived from the FLD INX signal arrives, flip-flop 253 resets, the CVSG clock is reenabled and synchronizatin has been accomplished. Explanatory timing diagrams are provided in FIG. 6.

If the computer video system hardware is busy, it provides a signal on line 255, to the direct reset input of flip-flop 253, and a resynchronization attempt cannot be made. This guarantees an operation will never fail to complete once begun.

If the CPU addresses the video subsystem when the clock is stopped to the CVSG, it will abort the resynchronization attempt and restart the clock. If the clock were to remain stopped, the bus cycle would not complete and the processor would trap to a predetermined location, indicating an access to a non-existent address. A synchronization attempt also will abort after having the clock stopped for four lines or 254 microseconds; this is done to prevent the dynamic video memory from being corrupted as the refresh operation is discontinued while the clock is stopped. Synchronization is given the lowest priority among the video sub-system tasks, since it normally will happen only once when the combined video disc/computer overlay mode is entered.

Figure 7:
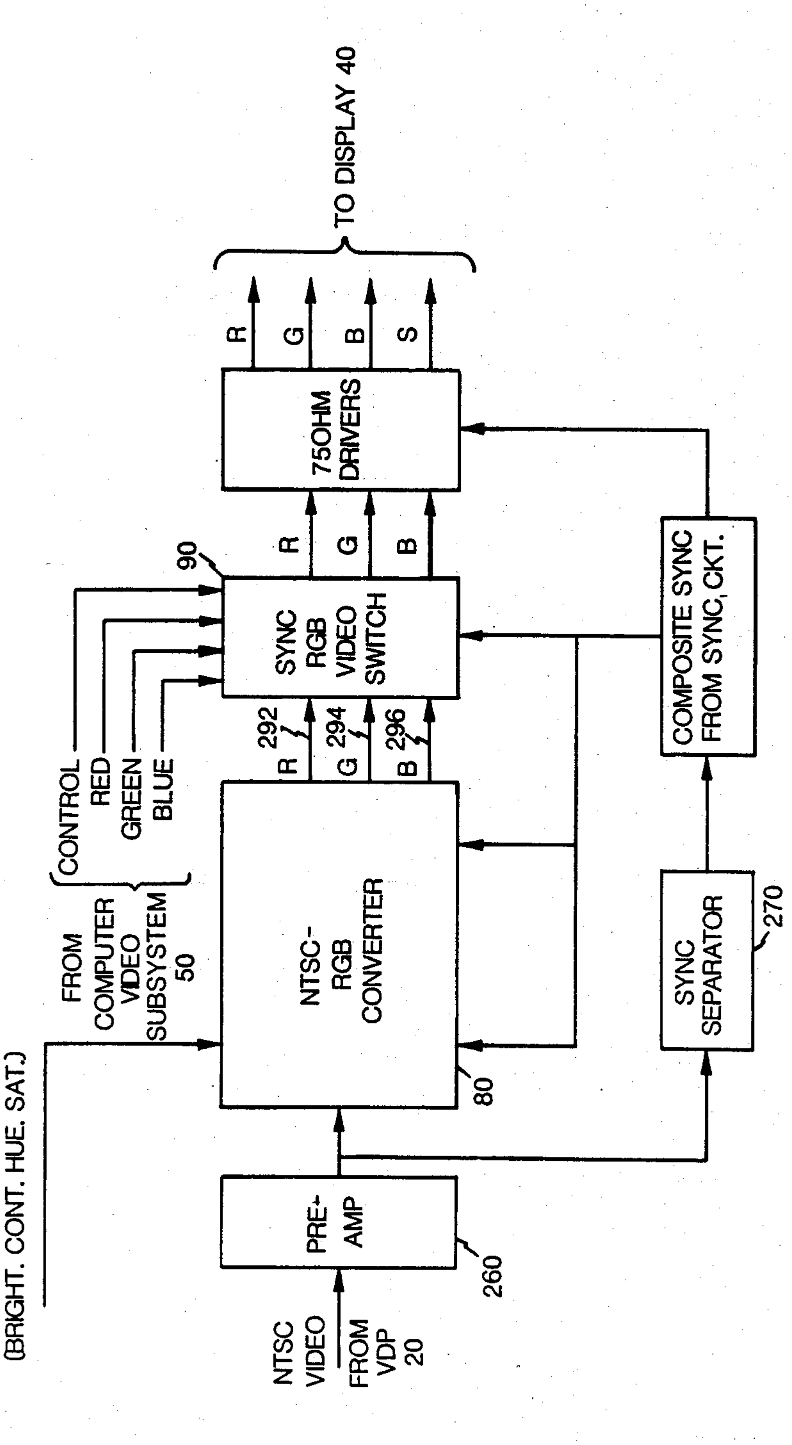
FIG. 7 is a very slightly more detailed block diagram of the video signal combining circuitry of FIG. 1.

A very slightly more detailed block diagram of the video signal combining circuitry of FIG. 1 is shown in FIG. 7. It should be understood that this circuitry will necessarily have to be modified to be adapted to the precise characteristics of the computer signal source which is employed by a user. Such modification is within the skill of the art. For example, one embodiment provides logic signals for generating text and graphics, whereas another might provide analog signals. Referring now to the drawing, pre-amplifier 260 receives a 1.0 volt baseband composite video signal from the video disc player and adjusts the level to the signal required by the NTSC-to-RGB converter 80.

Following the pre-amplifier 260 is a sync separator 270 which removes the composite video sync pulses, horizontal, vertical and equalizing. Filtering is provided on the sync separator output to minimize the probability of detecting as a false sync pulse noise on the incoming video. Three types of filtering are involved. First, an analog RC integrator filters the noisy signal supplied to the sync stripper. Second, the logic will honor a sync pulse only during a small portion of the line period, centered around the expected position. Third, the logic honors only the first sync pulse if multiple pulses are detected on the same line.

The details of NTSC-to-RGB converter 80 are immaterial, as NTSC-to-RGB conversion is conventional; indeed, every U.S. television receiver has such a converter.

The video switch 90 synchronously controls which of the two, if either, of the video inputs is to be displayed, pixel-by-pixel. It is partly digital and partly analog; the details of its design are not part of this invention, as the circuitry is well within the skill of the circuit designer. As stated above, the switch monitors the digital output of the video memory of the computer video sub-system (which ultimately become the computer-generated RGB signals). One of the colors is selected as a transparent color for controlling the switch (this color being black for purposes of this example). If the color is not black (the transparent color), the switch displays the color signal provided by the computer. If the switch is disabled or the color from the computer is black, the transparent color, then the video disc signal is displayed. Using this scheme, the system may display any of the seven of the eight possible colors at any time. If an optional in color-mapped mode is enabled, the seven non-transparent colors may be reprogrammed as any of the 256 possible colors, including black. The logic associated with the switch also may add drop-shadowing to the images supplied by the computer video sub-system, through a simple extension of the color map. If the last of a series of pixels displayed from the computer video sub-system has a drop-shadow bit set in the color map, the video switch control logic then may keep the screen blank for one or more additional pixels before enabling the video disc player's display.

The video switch has three modes of operation, determined by software control. First, in the overlay mode, it operates to combine the two video sources. Second, in the computer-only mode, the NTSC video output from the video disc player is permanently blanked and only the computer-generated video is displayed. This mode is used when the video disc player is taken off line to scan or search or to use the computer video sub-system as a normal terminal. The sync signal from the video player is ignored at that time and the display continues to operate in 525 line interlaced mode from the internal master sync generator. In the VDP-only mode, the computer generated video is blanked and only the NTSC video output from the video disc player is enabled. This permits the system to operate as a normal NTSC monitor, but with the unwanted video in the margins blanked. This mode is useful when it is desired to create a computer-generated image for display at a later time. These modes and the manner in which they are controlled are discussed in greater detail elsewhere in this description.

At the output of the video switch there are three drivers suitable for driving 75 ohm loads.

Synchronization for the monitor can be provided either on the green signal or on a separate signal line.

The slave sync generator contains an auxiliary counter to provide additional horizontal timing signals such as $\frac{1}{4}$ and $\frac{3}{4}$ line indicators (H20), last half or first half of line indicators (H40), and a pulse which is present during most of a line but not during the horizontal sync period (H10).

The various signals on lines 310 (H20), 312 (H04) and 314 (H40) are provided by a pair of counters 330 and 332 plus inverter 334, comprising auxiliary counter 217. These registers are driven (i.e., clocked) by the 1.2587 MHz signal provided on line 163 by the phase locking loop of the slave sync generator. A SLAVE H DRIVE signal on line 336 clears the registers 330 and 332, thus controlling when they start counting and insuring that they start at the beginning of a horizontal line.

Figure 8:
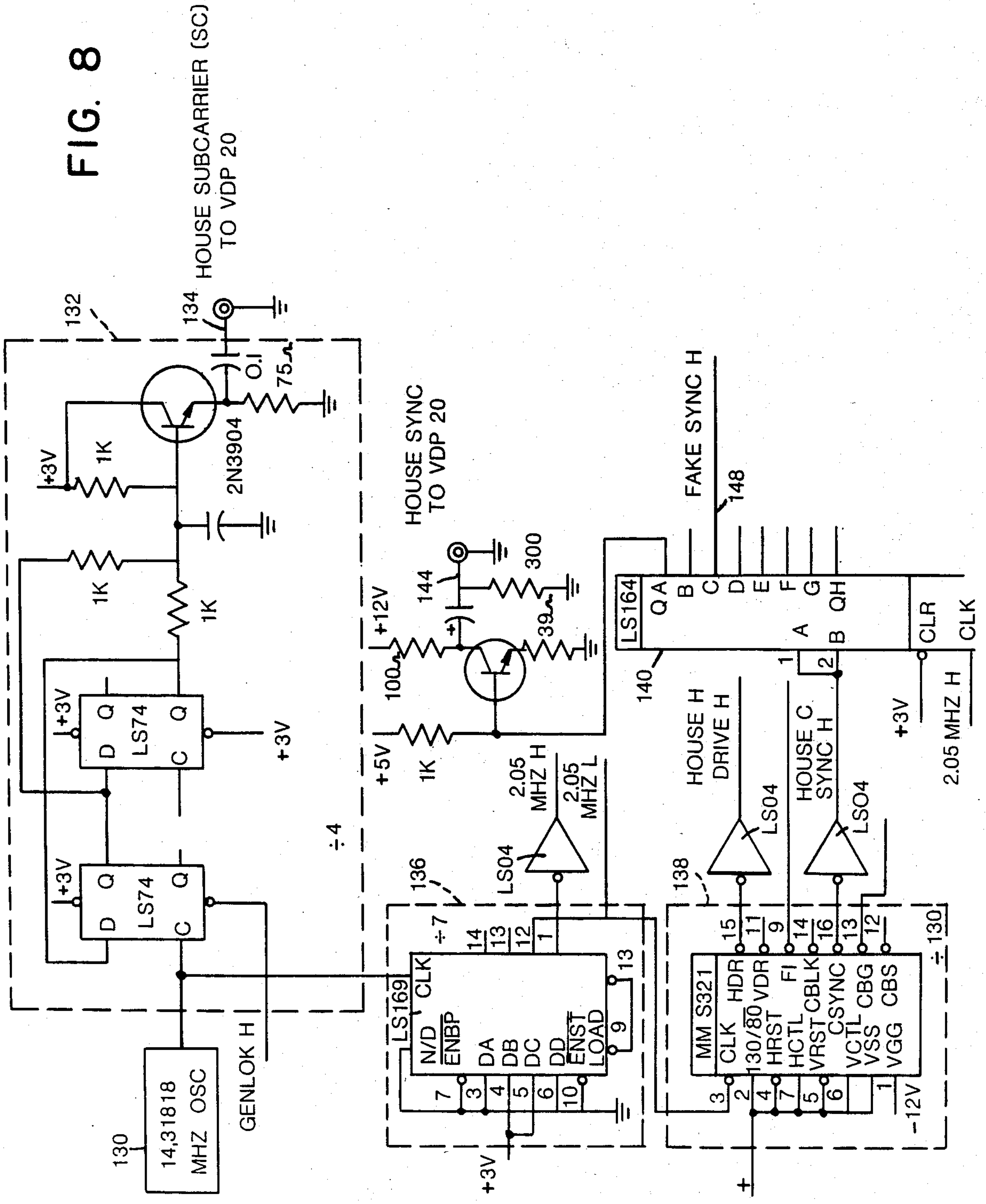
FIG. 8 is a logic diagram for the house sync generator.
Figure 9A:
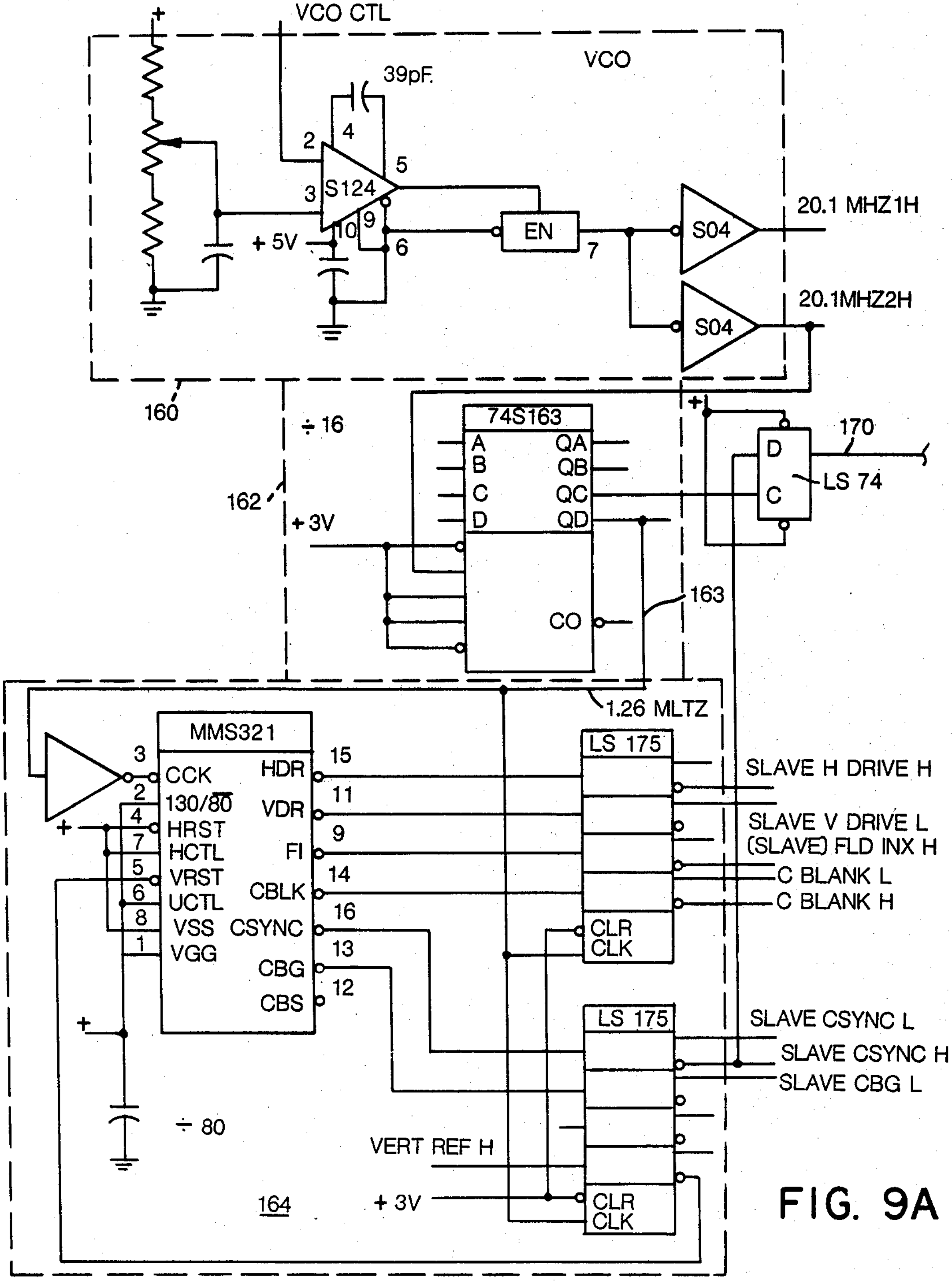
FIGS. 9A and 9B are logic diagrams for the slave sync generator.
Figure 9B:
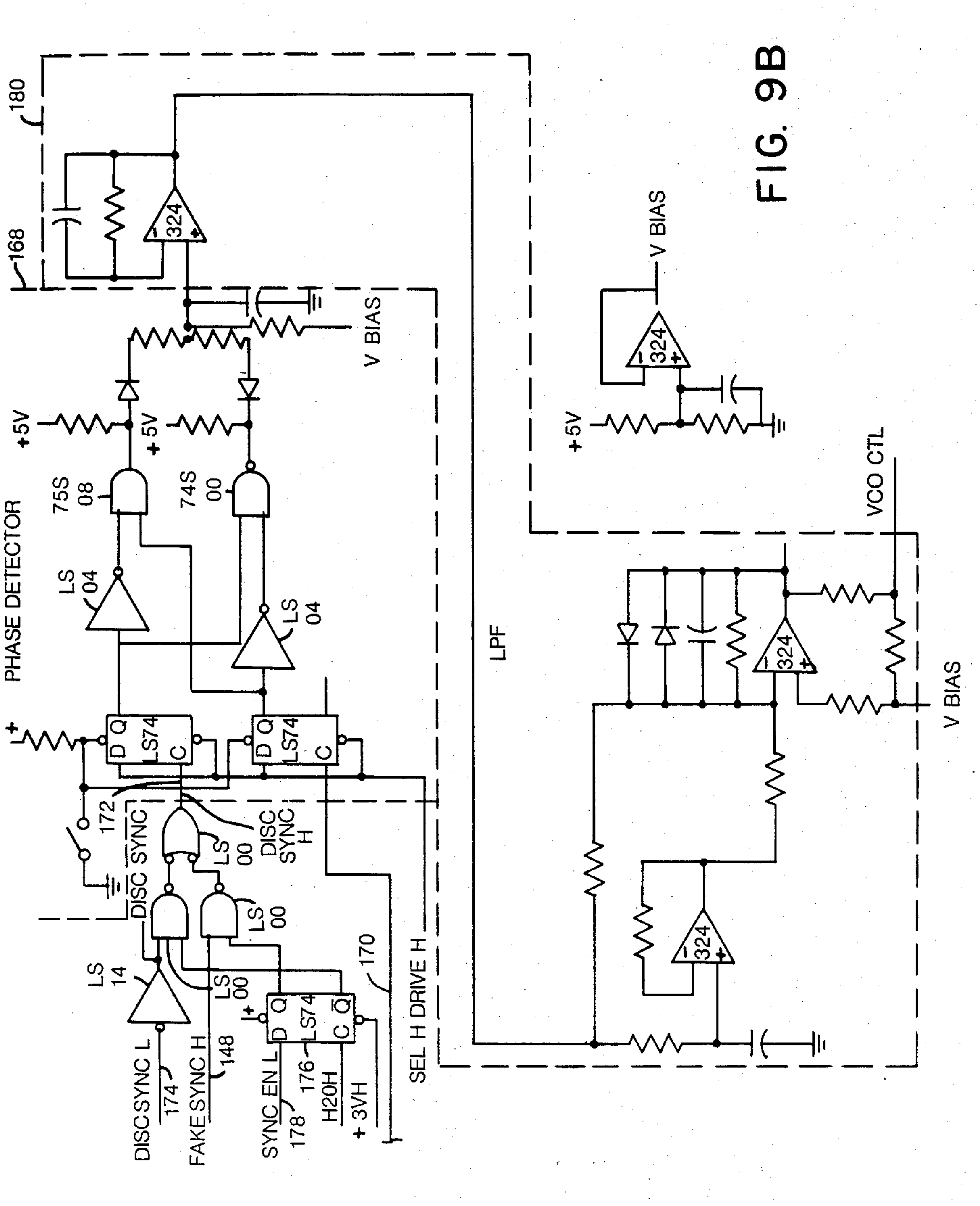
Figure 10:
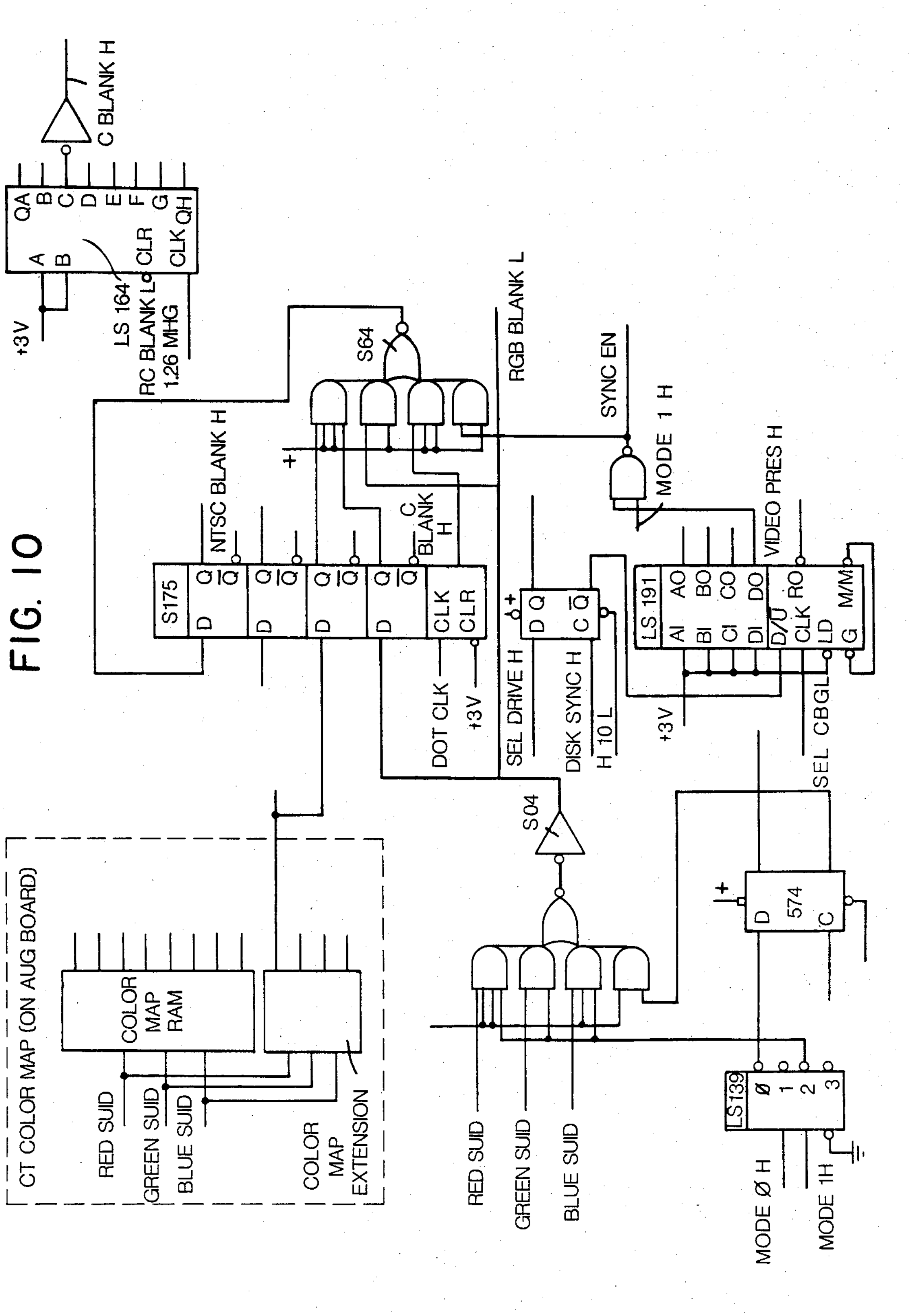
FIG. 10 is a logic diagram for a mode control and video switch control.

FIG. 8 shows detailed logic for constructing the house sync generator. FIGS. 9A and 9B show detailed logic for implementing the slave sync generator. FIG. 10 shows detailed logic for constructing a mode control and video switch control. The MODE 0 and MODE 1 signals indicated as inputs thereto select the mode (i.e., VDP only, computer only or both); they are provided by control status registers, not shown.

Although a video disc player providing an NTSC output is shown herein as the source of video signals to be combined with the computer-generated video, it should be appreciated that other sources may be adapted to the same inventive concept. These other sources include other NTSC-encoded sources as well as non-NTSC sources, such as PAL, SECAM or even RGB sources. A non-RGB, source should be converted to RGB format, though. However, the invention is not limited to the use of RGB signals. The concept requires simply the switching of signals with no substantial phase-modulation component; formats other than RGB can be used if both sources are provided in or converted to that format prior to switching.

Having thus described the inventive concept and a detailed implementation, it will be readily apparent to those skilled in the art that other implementations are possible and that various improvements, alterations and modifications may be desirable, without departing from the spirit and scope of the invention. Accordingly, the foregoing description is illustrative and exemplary only and is not intended to be limiting. The invention is intended to be limited in scope only as defined in the appended claims.

What is claimed is:

1. Apparatus for combining video signals from a video source with computer-generated text and graphics signals provided from a computer video output subsystem, for display together, in overlay, on a raster scan video display device, comprising:

A. the video signals containing synchronization signals;

B. means for converting the format of at least one of said video signals and computer-generated text and graphics signals to the non-phase modulated format of the other if both are not already in that format, or to a preselected non-phase modulated format if neither is in a non-phase modulated format;

C. slave synchronization means for generating slave synchronization signals responsive to the synchronization signals contained in the video signals;

D. a video switch connected between the inputs of the display device, on the one hand, and the non-phase modulated versions of the video signals and the computer-generated text and graphics signals, on the other hand, for selectively supplying to the display device, for each pixel, either the video signals or the computer-generated signals; and E. the slave synchronization signals being supplied to the computer video output subsystem as a clock for controlling the rate and time at which it supplies pixel information to the video switch, and to the video switch to control the time at which it switches between the video signals and the computer-generated signals, whereby the video switch and the computer video output subsystem are synchronized to the video signals, to track jitter in the video signals and ensure that registration is maintained between the video signals and the computer-generated signals.

2. Apparatus for combining video signals from a video source with the RGB output of a computer-generated text or graphics image provided from a computer video output subsystem, for display together, in overlay, on a raster scan video display device, comprising:

A. the video signals containing synchronization signals;

B. means for converting the video signals to RGB format if not already in that format;

C. slave synchronization means for generating slave synchronization signals responsive to the synchronization signals contained in the video signals;

D. a wideband, three channel (i.e., one channel each for red, green and blue) video switch connected between the RGB inputs of the display device, on the one hand, and the video signals and the RGB signals from the computer video output subsystem, on the other hand, for selectively supplying to the display device, for each pixel, either the RGB video signals or the computer-generated RGB signals; and E. the slave synchronization signals being supplied to the computer video output subsystem as a clock for controlling the rate and time at which it supplies pixel information to the video switch, and to the video switch to control the time at which it switches between the video signals and the computer-generated RGB signals, whereby the video switch and the computer video output subsystem are synchronized to the video signals, to track jitter in the video signals and ensure that registration is maintained between the video signals and the computer-generated RGB signals.

3. The apparatus of claim 2 further including master sync generator means for supplying to the video source a house synchronization signal, to be used by the video source for coarsely synchronizing its output thereto.

4. The apparatus of claim 2 or claim 3 wherein the video switch is adapted to be responsive to an attribute of one of the source signal sets (i.e., video signals and computer-generated RGB signals) to select as the signal source for a pixel to be displayed the video signals if the attribute is in a first state and the computer-generated RGB signals if the attribute is in another state.

5. The apparatus of claim 4 wherein said attribute is the color indicated by the computer-generated RGB signals, the first state is a predetermined color indicated by those RGB signals and the second state is any other color indicated thereby, whereby the computer controls whether the video signals or the computer generated image is to be displayed, separately for each pixel.

6. The apparatus of claim 5 wherein the video source is a video disc player (VDP).

7. The apparatus of claim 6 wherein the output of the video source is encoded in NTSC format.

8. The apparatus of claim 6 wherein the slave synchronization means is adapted to derive the slave synchronization signals from the house synchronization signals when the video disc player is scanning from one frame on the disc to another frame, or is being spun up or down, to prevent rolling and tearing of the picture.

9. The apparatus of claim 6 wherein the video switch is adapted to display only the computer-generated video when the VDP is taken off line to scan or search.

* * * * *